March 8, 1927.
F. REINHARD
GEAR SHIFT STOP
Filed Oct. 23, 1926
1,619,955
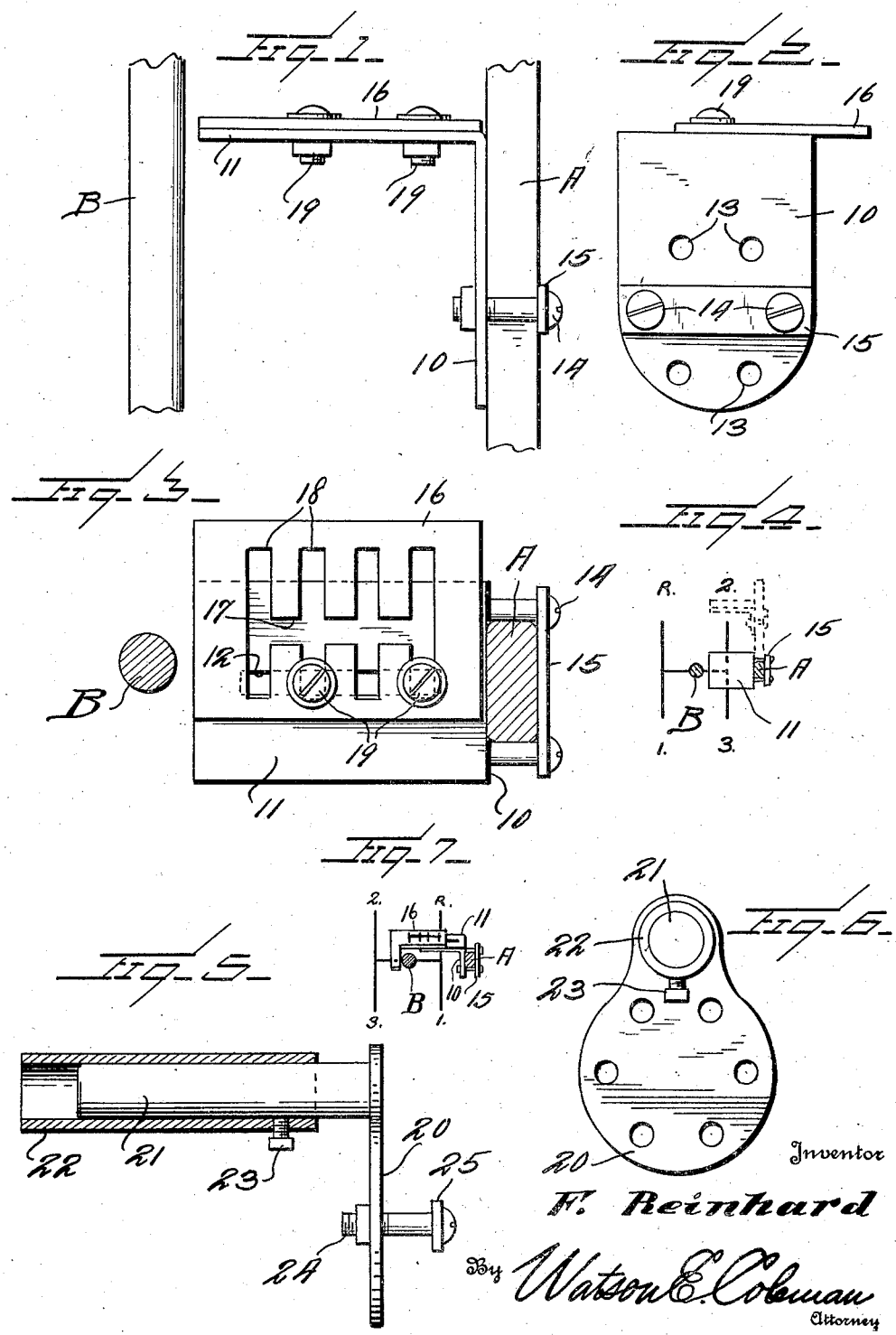
Inventor
F. Reinhard
By Watson E. Coleman
Attorney Patented Mar. 8, 1927.

1,619,955

UNITED STATES PATENT OFFICE.

FRANK REINHARD, OF EAU CLAIRE, WISCONSIN.

GEAR-SHIFT STOP.

Application filed October 23, 1926. Serial No. 143,676.

This invention relates to means for preventing the gear shift lever from being shifted from its neutral position in to second or third speed when the brake is on and the general object of the invention is to provide a device of this character which will act to warn the driver that his emergency brake is set and that he should release the emergency brake before going into second or third speed. Quite often a driver unwittingly shifts his gear control lever into second or third speed when the brake is on and this, of course, wears out the brake linings and damages the brakes. My device is intended to prevent this eventuality.

A further object of the invention is to provide a device of a very simple character which may be applied preferably upon the brake lever and which will extend out at right angles thereto and when the emergency brake is drawn backward to brake the car, will obstruct any movement of the gear shift lever which would shift the gears to second or third speed, and another object in this connection is to provide a device which is adjustable to various makes of cars.

My invention is illustrated in the accompanying drawings wherein:—

Figure 1 is a rear elevation of a gear shift and brake lever with my attachment applied thereto;

Fig. 2 is a rear face view of the attachment;

Fig. 3 is a top plan view of the attachment, the levers being in section;

Fig. 4 is a diagrammatic view showing the manner in which the attachment functions;

Fig. 5 is a side elevation partly in section of another form of the device;

Fig. 6 is an end elevation thereof.

Fig. 7 is a diagrammatic view as in Figure 4 but showing a slightly modified form of the stop plate 16.

Referring to these drawings, in Figure 1 I have illustrated a preferable form of my device which comprises an angular bracket plate designated 10, made of metal, the side of which is adapted to be applied against the side face of the emergency brake lever and which is provided with a horizontal portion 11 having a longitudinally extending slot 12. The plate 10 is formed with a plurality of apertures 13 concentric to a center and the plate is adapted to be clamped upon the brake lever A by means of bolts 14 and a clamping plate 15, through which the bolts pass. By providing a plurality of bolt openings 13 concentric to a common center, the bracket plate 10 may be adjusted into a plurality of positions upon the emergency brake lever and then clamped in this desired position. Obviously the bracket may be shifted up or down upon the brake lever and clamped at any desired point.

In order to secure a proper adjustment of the stop which I have devised, I provide a plate 16 formed with a medial slot 17 and a plurality of laterally extending recesses 18 opening into the slot 17. Bolts 19 pass through the slot 17 or the recesses 18 and through the slot 12. Thus, it will be obvious that by loosening the bolts 19, the plate 16 may be shifted longitudinally upon the plate 11 or shifted laterally so that the bolts will be disposed in any pair of offset slots or recesses 18.

In Figure 4, I have illustrated diagrammatically the application of this device to a brake lever A. The gear shift lever is designated B and is illustrated as in neutral position. To shift the gears into low speed the gear shift lever B is shifted from neutral to the left and then rearward, and in order to shift from a neutral position into second or third speeds, the gear lever must be shifted to the right or toward the brake lever A, and then shifted forward or rearward. The stop composed of the supporting portion 10 and the plates 11 and 16 is so mounted upon the lever A that when the emergency brake lever A is retracted to set the brake, the stop will come opposite the neutral position of the gear shift lever B, and obstruct the movement of the lever B toward the right and thus prevent the gear shift lever from being shifted either into the second or third speed until the emergency brake is released. Under these circumstances the brake moves forward and downward and the stop is carried out of its obstructing position so that the gear shift lever may be shifted into second or third speed.

In Figure 5, I have illustrated another and simpler form of the device comprising the supporting plate 20 having the outwardly projecting pin 21 upon which a stop sleeve 22 slides so that it may be adjusted out or in. The stop sleeve is held in place in its adjusted position by means of a set screw 23. The plate 20 is also provided with a plurality of apertures concentric to a common center for the passage of the clamping bolts 24 which are engaged with the clamping plate 25. It will be seen that this form of stop may be adjusted rotatably upon the emergency brake lever and that the sleeve 22 may be adjusted out or in to suit different makes of cars and different relations of the brake lever and gear shift. By shifting the plate 20 upon the gear shift lever in a direction parallel to the direction of movement of the gear shift lever, the pin 22 may be shifted forward or rearward of the gear shift lever, a result to be secured in the construction shown in Figure 1 by shifting the plate 16.

In Figure 7, I have illustrated a modified form of the stop plate 16 which is used on those machines where the lever B is shifted to the left from a neutral position to get it into second speed or into third speed. In this form the plate 16, which is formed with the slot, as illustrated in Figure 3, has a finger 16ª which extends on the left hand side of the gear shift and thus when the emergency brake is on, this finger will block any movement of the gear shift to the left from its neutral position. This device will permit the gear shift to be moved into low speed if desired just as the structure shown in Figure 4 will.

I do not wish to be limited to either of the two forms of my invention illustrated, though I regard the form shown in Figure 1 as being particularly effective, inasmuch as many changes might be made in details without departing from the spirit of the invention to suit various makes of cars having different gear shifts. I have illustrated the device as applied to a standard gear shift.

I claim:—

1. As an article of manufacture, a stop for preventing movement of the gear shifting lever from a neutral position when the emergency brake is set comprising a plate adapted to be applied against the face of the braking lever and having an angularly projecting portion adjustable as to length, the plate having a plurality of bolt holes arranged concentrically, and a clamp to engage over the lever having bolts passing through the bolt holes.

2. As an article of manufacture, a stop for preventing movement of the gear shifting lever from a neutral position when the emergency brake is set comprising a plate adapted to rest against the side face of the brake lever, means for holding said plate in adjusted position thereon and permitting the plate to be adjusted up or down on the brake lever and forward or rearward with relation thereto, said plate having an angularly projecting, longitudinally slotted portion, and a plate resting upon said angularly projecting portion formed with a medial slot and lateral slots extending therefrom, and bolts passing through said slots and holding the plate in adjusted position.

In testimony whereof I hereunto affix my signature.

FRANK REINHARD.